(12) United States Patent
Kielian et al.

(10) Patent No.: US 8,840,448 B1
(45) Date of Patent: Sep. 23, 2014

(54) FISH SKINNING DEVICE

(71) Applicant: Ultimate Fishing Gear, Inc., La Vista, NE (US)

(72) Inventors: Chris Kielian, Plattsmouth, NE (US); Brian Kielian, La Vista, NE (US); Perry Parks, Papillion, NE (US); Eric Parks, Papillion, NE (US)

(73) Assignee: Ultimate Fishing Gear, Inc., La Vista, NE (US)

( * ) Notice: Subject to any disclaimer, the term of this patent is extended or adjusted under 35 U.S.C. 154(b) by 0 days.

(21) Appl. No.: 14/086,027

(22) Filed: Nov. 21, 2013

Related U.S. Application Data

(63) Continuation-in-part of application No. 13/601,047, filed on Aug. 31, 2012, now Pat. No. 8,690,646.

(60) Provisional application No. 61/530,865, filed on Sep. 2, 2011, provisional application No. 61/788,623, filed on Mar. 15, 2013.

(51) Int. Cl.
*A22C 17/12* (2006.01)
*A22C 25/17* (2006.01)
*A22C 25/16* (2006.01)

(52) U.S. Cl.
CPC .............. *A22C 25/16* (2013.01); *A22C 25/17* (2013.01)
USPC ........................................... 452/125

(58) Field of Classification Search
USPC ............ 452/125, 127–130, 132, 133; 99/584, 99/585, 591, 589; 83/870, 370, 360, 364, 83/368; 30/276, 356
See application file for complete search history.

(56) References Cited

U.S. PATENT DOCUMENTS

| | | | |
|---|---|---|---|
| 2,547,237 A | 4/1951 | Townsend | |
| 3,164,858 A | 1/1965 | De Moss | |
| 3,328,834 A | 7/1967 | Pulciver | |
| 3,590,424 A | 7/1971 | Shults | |
| 3,683,456 A * | 8/1972 | Beasley | 452/132 |
| 3,872,544 A | 3/1975 | Lange | |
| 4,063,332 A | 12/1977 | McCullough | |
| 4,071,923 A * | 2/1978 | Smith | 452/133 |
| 4,162,558 A | 7/1979 | Rubio | |
| 4,186,461 A * | 2/1980 | Leining | 452/133 |
| 4,451,953 A * | 6/1984 | Leining | 452/133 |
| 4,631,780 A * | 12/1986 | Leining | 452/133 |
| 4,653,151 A * | 3/1987 | Berdou | 452/127 |
| 4,667,372 A | 5/1987 | Till | |
| 4,993,112 A * | 2/1991 | Burnett et al. | 452/134 |
| 5,221,229 A | 6/1993 | Brophy | |
| 5,326,310 A * | 7/1994 | Gugg | 452/133 |

(Continued)

*Primary Examiner* — Richard Price, Jr.
(74) *Attorney, Agent, or Firm* — Advent, LLP (57) ABSTRACT

Techniques and devices are described for preparing a fish fillet. The techniques and devices facilitate the removal of the skin and/or rib bones of the fish from the meat that forms the fillet. In embodiments, the techniques employ a fish skinning device that includes a roller and a blade. The roller is configured to contact the skin included on a fillet so that rotation of the roller causes the fillet to be directed toward the blade. The roller and blade are configured so the skin passes between the roller and blade and is generally separated and directed away from the meat. A blade float assembly permits the blade to float with respect to the blade during use to receive the skin or rib bones of the fish fillet between the roller and the blade.

20 Claims, 9 Drawing Sheets

(56) References Cited

U.S. PATENT DOCUMENTS

| | | |
|---|---|---|
| 5,429,548 A | 7/1995 | Long et al. |
| 5,476,417 A | 12/1995 | Long et al. |
| 5,609,519 A * | 3/1997 | Townsend .................... 452/127 |
| 5,630,750 A | 5/1997 | Byrd |
| 5,813,904 A | 9/1998 | Aslanis et al. |
| 6,089,967 A * | 7/2000 | Gugg ............................ 452/127 |
| 6,497,615 B1 | 12/2002 | Klager |
| 7,618,308 B1 | 11/2009 | Hernandez |
| 2003/0143939 A1 | 7/2003 | Barlow et al. |
| 2007/0123156 A1 | 5/2007 | Shipman |

* cited by examiner

FISH SKINNING DEVICE

CROSS-REFERENCE

The present application is a continuation-in-part of U.S. patent application Ser. No. 13/601,047, entitled: "FISH SKINNING DEVICE" filed on Aug. 31, 2012, which claims priority under 35 U.S.C. §119(e) to U.S. Provisional Application Ser. No. 61/530,865, titled "FISH SKINNER" filed on Sep. 2, 2011. The present application further claims priority under 35 U.S.C. §119(e) to U.S. Provisional Application Ser. No. 61/788,623, titled "FISH SKINNING DEVICE" filed on Mar. 15, 2013. U.S. patent application Ser. No. 13/601,047 and U.S. Provisional Application Ser. Nos. 61/530,865 and 61/788,623 are herein incorporated by reference in their entireties.

BACKGROUND

Recreational fishing is a popular activity that is enjoyed across many segments of the population. Recreational fishing is fishing primarily for pleasure or competition (e.g., sport fishing). Although recreational fishermen (who are sometimes referred to as "anglers"), and in particular sport fishermen, may release some or all of the fish they catch (catch and release), fish, which are of legal size and species, that are caught by recreational fishermen are typically consumed by the fisherman and his/her family and friends.

Most persons who eat fish consume a fillet of meat that is located between the skin and the major bones of the fish. To prepare this fillet of meat, the fillet (including skin) is removed from the rib bones of the fish, and then the skin is removed from the meat, or "skinned." Typically, fish are "skinned" (e.g., the skin of the fish is removed from the flesh of the fillet) using a knife to cut the skin from the flesh of the fillet of meat. Often, a specialized knife, such as a filleting knife, is used to separate the skin from the meat forming the fillet.

Though most recreational fishermen and cooks or chefs who commonly prepare fish caught by the fishermen are capable of skinning a fish using a filleting knife, the quality of the fillets produced can vary. Using a filleting knife, skill and experience are necessary to properly remove the skin of the fish in order to maximize the recovery of meat in the fillet, obtain a visibly pleasing fillet, and do so in a timely manner. In particular, fresh water fish such as Walleye, perch, crappie, blue gill, bass, and Northern Pike are considered difficult to skin due to the nature of the skin/bones included in the body of the fish.

SUMMARY

Techniques and devices are described for preparing a fish fillet. The techniques facilitate the removal of the skin (e.g., skin and scales, etc.) of the fish from the meat that forms the fillet, and/or the removal of the rib bones of the fish from the fillet. In embodiments, the techniques employ a fish skinning device that includes a roller and a blade. The roller is configured to contact the skin of a fillet so that rotation of the roller causes the fillet to be directed toward the blade. The roller and blade are configured so the skin passes between the roller and blade and is generally separated and directed away from the meat. In embodiments, a blade actuation assembly supports the blade and permits the blade to float with respect to the roller during use. For example, the blade actuation assembly may include a blade float assembly that allows the blade to float with respect to the roller during operation to receive the skin or rib bones of the fish fillet between the roller and the blade.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Skinning fish can be a time-consuming and difficult task that detracts from preparing, cooking and the overall enjoyment of consuming fish. Different sizes, shapes, and proportions of fish and fillets from these fish make automating the skinning process difficult or result in a large amount of waste in comparisons to having someone who is skilled prepare the fish using a filleting knife.

To skin a fish, the filleting knife is drawn parallel to the skin or bones. Thus, the person preparing the fish must hold the fish while moving the knife away from him/her to separate the skin. This action requires coordination, and inadvertent injuries (e.g., cuts to hands of the person preparing the fish from the filleting knife) can occur. Moreover, preparing fish for consumption (e.g., "cleaning the fish") using a filleting knife can be time consuming, especially when care is taken to remove the skin without also removing an excessive amount of the meat of the fillet.

Accordingly, techniques and devices are described for skinning and/or deboning a fish fillet to remove any skin and/or bones from the meat that forms the fillet. In embodiments, a fish skinning device is disclosed. The fish skinning device includes a powered roller that is configured to contact the skin and/or rib bones (e.g., bones and tissue connecting the bones to meat that forms the fillet) included on the fillet so that rotation of the roller causes the fillet to be directed toward a blade. The roller can be configured with a series of radial projections or groves to aid in engaging the skin and/or bones and connective tissue. The roller and blade are configured so that the skin passes between the roller and the blade, and is generally directed away from the meat. The rib bones can pass between the roller and blade in a similar manner when separating the bones and meat from one another.

The fish skinning device further includes a blade actuation assembly that is configured to support the blade. The blade actuation assembly permits the blade to be orientated to a variety of positions with respect to the roller. For example, the blade actuation assembly can adjust between a first (open) position where the blade is spaced away from the roller and a second (closed) position where the blade is positioned closer to the roller in comparison to the open position (e.g., the blade is adjacent to an outer surface of the roller). In embodiments, the blade actuation assembly can move the blade to a variety of positions between the open and closed positions. In some embodiments, the open and closed positions may correspond, respectively, substantially to the maximum and minimum extent to which the blade can be positioned toward/away from the roller. In implementations, the open position corresponds to a configuration in which a portion of a fish can be accepted for processing. A closed position can correspond to a position in which the roller can engage, for example, the skin included on a fillet.

In embodiments, a blade actuation assembly, used to support and position the blade, is configured so the blade can float in operation. For example, the blade actuation assembly can include or be coupled to a blade float assembly that permits the blade to float with respect to the roller. In an embodiment, the blade float assembly may comprise a slot and pin assembly that includes a pin and corresponding slot included on one or more of the blade, a blade support, a bracket, or linkage of the blade actuation assembly to allow the blade to float during skinning and/or deboning of the fish fillet. Thus, the blade may float to an extent permitted by the blade actuation assembly as the blade separates meat from the skin and or bones.

The blade float assembly may permit fine blade position adjustment while coarse adjustment is controlled by a lever assembly that includes a lever that can be manipulated by the user to position the blade between the open and closed positions. The blade actuation assembly, including the blade float assembly, can in this manner adjust the position of the blade with respect to the roller during use depending on the toughness of the meat/tissue being separated from the skin and/or bones, the thickness of the skin and or bones, variations in toughness and/or thickness of the meat, skin, and or bones, combinations thereof, and so forth. For example, the blade may tilt along its length if, for example, a first end of the blade is separating skin or rib bones from meat that is tougher than meat adjacent a second end of the blade opposite the first end.

In embodiments, the location of the blade with respect to the skin and meat can be identified based on the relative toughness of the skin in comparison to that of the meat. The location of the blade when separating the bones from the fillet is automatically adjusted based on differences in physical structure (e.g., rigidity, toughness, and so forth) between the bones and the fillet. In this way, the blade may automatically be positioned to generally maximize meat recovery, generate a visually pleasing fillet, and so forth.

Example Device

Figure 1:
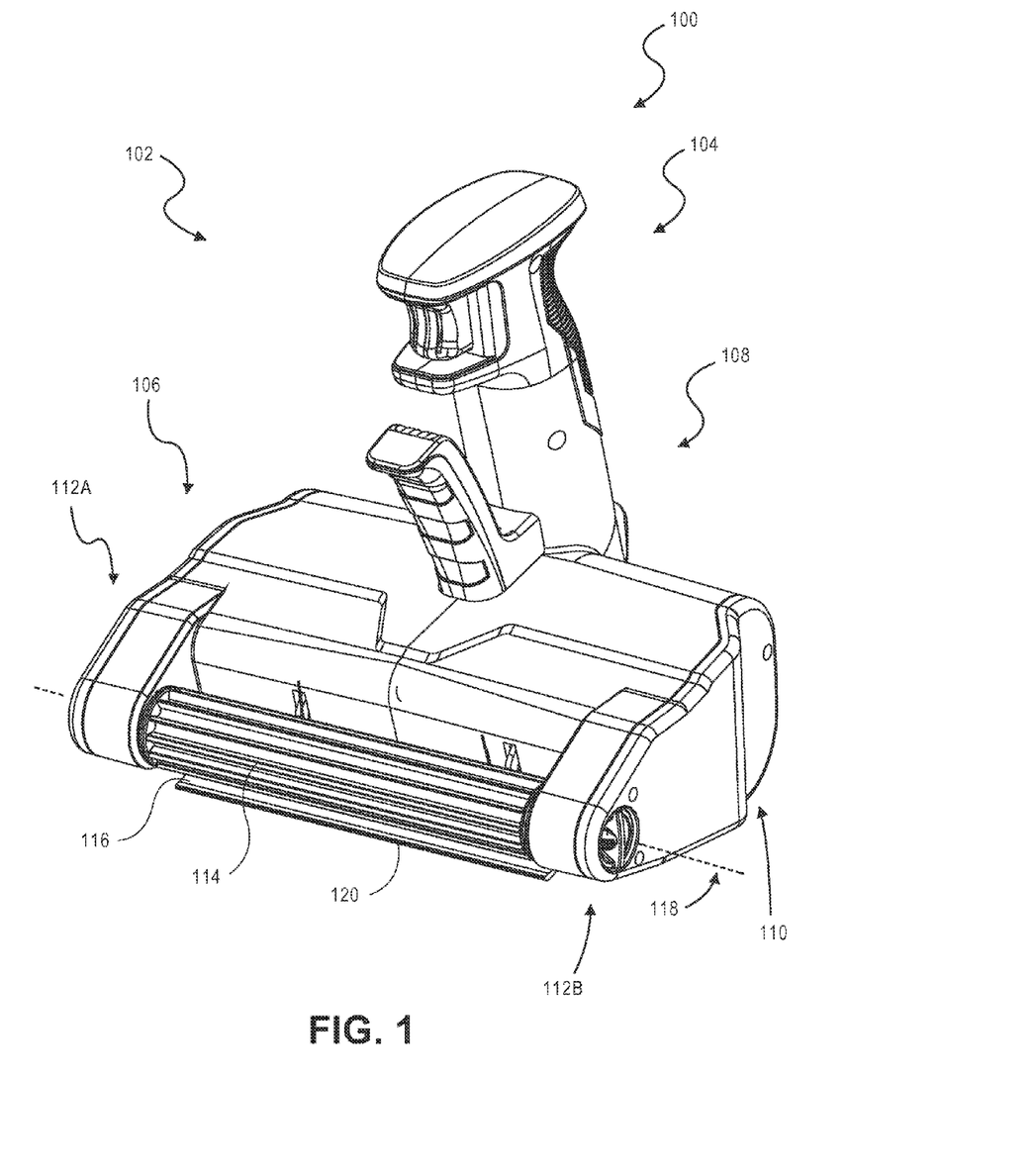
FIG. 1 is an isometric view illustrating a fish skinning device in accordance with example implementations of the present disclosure.

FIG. 1 illustrates a fish skinning device 100 in accordance with an example implementation of the present disclosure. The fish skinning device 100 can be used to separate skin and/or bones included on a fillet from the meat of the fillet. Fish, and in particular fresh water fish, includes bones/skin that is removed during preparation so edible meat is separated from inedible portions, e.g., the skin or bones. Example fish having skin/bones include, but are not limited to, Walleye, perch, crappie, blue gill, bass, and Northern Pike.

As illustrated, the fish skinning device 100 includes a housing 102. The housing 102 can be formed from a variety of materials. Materials can be selected for their inert nature, waterproofness, water resistance, thermal stability (heat resistance), resistance to trapping microbes, ability for convenient cleaning and sanitation, and so forth. In embodiments, the housing 102 or portions thereof are formed of materials such as plastic, stainless steel, aluminum, and so forth, that are generally considered "food grade" materials that lend themselves to hygienic food preparation (e.g., fish preparation).

The housing 102 illustrated comprises a handle portion 104 and a skinning portion 106. The handle portion 104 can be shaped with a grip (handle) 108 or other structure that is suitable for securing the fish skinning device during operation. For example, the housing 102, the handle portion 104, the skinning portion 106, or combinations thereof can include a grip (illustrated as a pistol grip-type handle formed by the handle portion 104 in FIG. 1) so a user can grasp and hold the fish skinning device 100 during operation. Other securing mechanisms can be used to limit or prevent movement during use. Examples include, but are not limited to: knobs, handles, hand straps, combinations thereof, and so forth.

The skinning portion 106 of the housing 102 is configured generally to house portions of the fish skinning device 100 that are used to separate the skin and or bones from the meat of the fillet. At least a portion of the housing 102 is configured with a substantially flat surface to support the fish skinning device on a work surface, e.g., a table top or bench. As illustrated, at least part of the skinning portion 106 includes a flat surface 110 (e.g., a surface that is substantially flat) to allow device 100 to rest on the work surface. Although the skinning portion 106 can include a substantially flat portion to support the fish skinning device 100 as illustrated, a portion of the skinning portion 106 can be configured for insertion/removal of a fillet. For example, part of the skinning portion distal from the handle portion 104 is tapered so a fillet can be fed into/out of the fish skinning device 100 when the device is positioned on a support surface. In other embodiments, the skinning portion 106 may be substantially the same size along its cross-section, but the skinning portion may form a slot into which a fillet (processed or unprocessed) can be fed or removed.

Having provided an overview of how a fish skinning device 100 can be generally configured, operative components of the fish skinning device 100 are now described. It will be apparent that the operative components may be implemented with the described housing 102 and with housings having other shapes or form factors. Moreover, it is contemplated that the housing 102 may be modified to accommodate additional functionality/components. As should further be appreciated, various shields, guards, covers, seals, and so forth can be included with the housing 102. For example, while the skinning portion 106 is illustrated with two extensions 112A, 112B that define an open or recessed area where the fillet is processed, in other embodiments, the housing 102 can extend over this area to, for example, prevent fluids from escaping from the area during operation.

With continued reference to FIG. 1, the fish skinning device 100 includes a roller 114 and a blade 116 that are generally operable to separate bones or skin from meat that forms a fillet of a fish. It is to be appreciated that the bones may be joined together by connective tissue. This connective tissue also may connect the bones to the meat that forms the fillet. This connective tissue, for example, may be tougher or more dense than the meat that forms the fillet.

As illustrated, the roller 114 and blade 116 are constructed so the roller 114 moves the fillet into contact with the blade 116. For example, the roller 114 is shaped as a cylinder with a longitudinal axis (e.g., a primary axis) 118 that is generally aligned with (e.g., substantially parallel to) a leading edge 120 of the blade 116 that is operable to separate the skin and/or bones from the meat of the fillet. Although the leading edge 120 is illustrated as being positioned adjacent the flat surface 110, in other embodiments the leading edge 120 may be positioned in other orientations with respect to the housing 102 and/or the roller 114.

In the embodiment illustrated, the roller 114 is configured to pull a fillet into contact with the leading edge 120 that separates the meat and skin or bones. In this way, during operation, the roller 114 automatically moves the fillet to skin or debone the fillet. The roller 114 may also push the separated skin or bones away from the meat so it can be removed by a user. In embodiments, the roller 114 rotates so the fillet (including skin) contacts the leading edge 120 before it contacts other portions of the blade 116. In some embodiments, the roller 114 may also be configured to reverse direction, e.g., to rotate clockwise and counter clockwise about the axis 118, for example, to free jammed material from between the roller 114 and blade 116.

By causing the skin of the fillet to pass between the roller 114 and blade 116 during skinning, the fish skinning device 100 can take advantage of the skin's toughness in comparison to that of the meat. For example, causing the skin to be inserted between the roller 114 and blade 116 can prevent damage to the meat, e.g., from operation of the roller 114. Causing the skin to pass between the roller 114 and blade 116 further allows the roller 114 to contact the outer surface of the skin, which typically has a higher coefficient of friction than that of the meat and/or will be less likely to contain fluids that may make the skin slippery.

Similarly, the bones and/or connective tissue of the fish can pass between the roller 114 and blade 116 during a deboning operation. The bones and associated connective tissue may be tougher than that of the meat that forms the fillet. For example, the bones and connective tissue may be sufficiently tough to withstand the pulling action of the roller 114 on the bones. In this manner, the fish skinning device 100 is configured so the bones pass between the roller 114 and blade 116 thereby preventing damage to the fillet during deboning.

Figure 2:
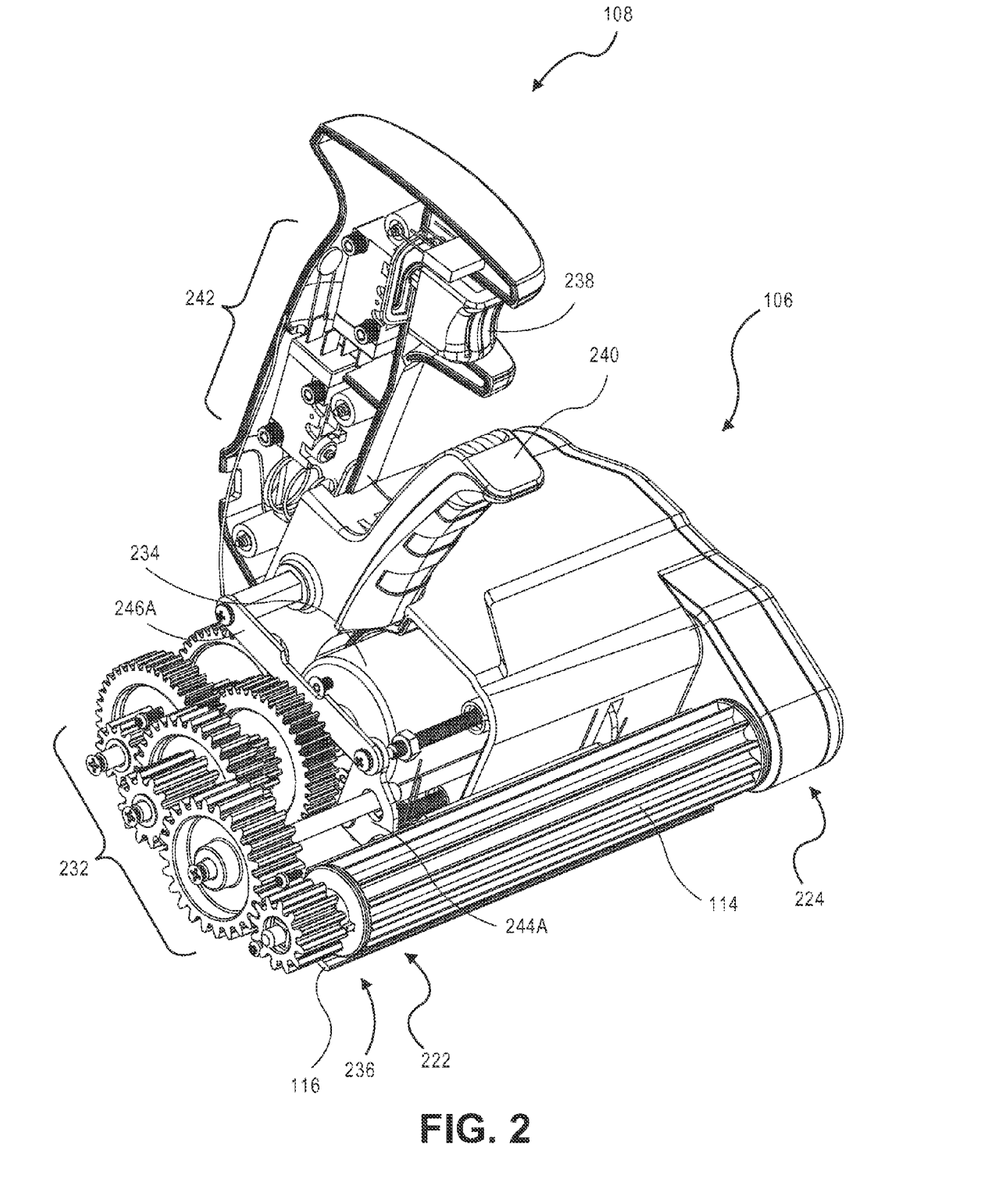
FIG. 2 is a cut away view illustrating the fish skinning device of FIG. 1 in accordance with example implementations of the present disclosure.
Figure 3:
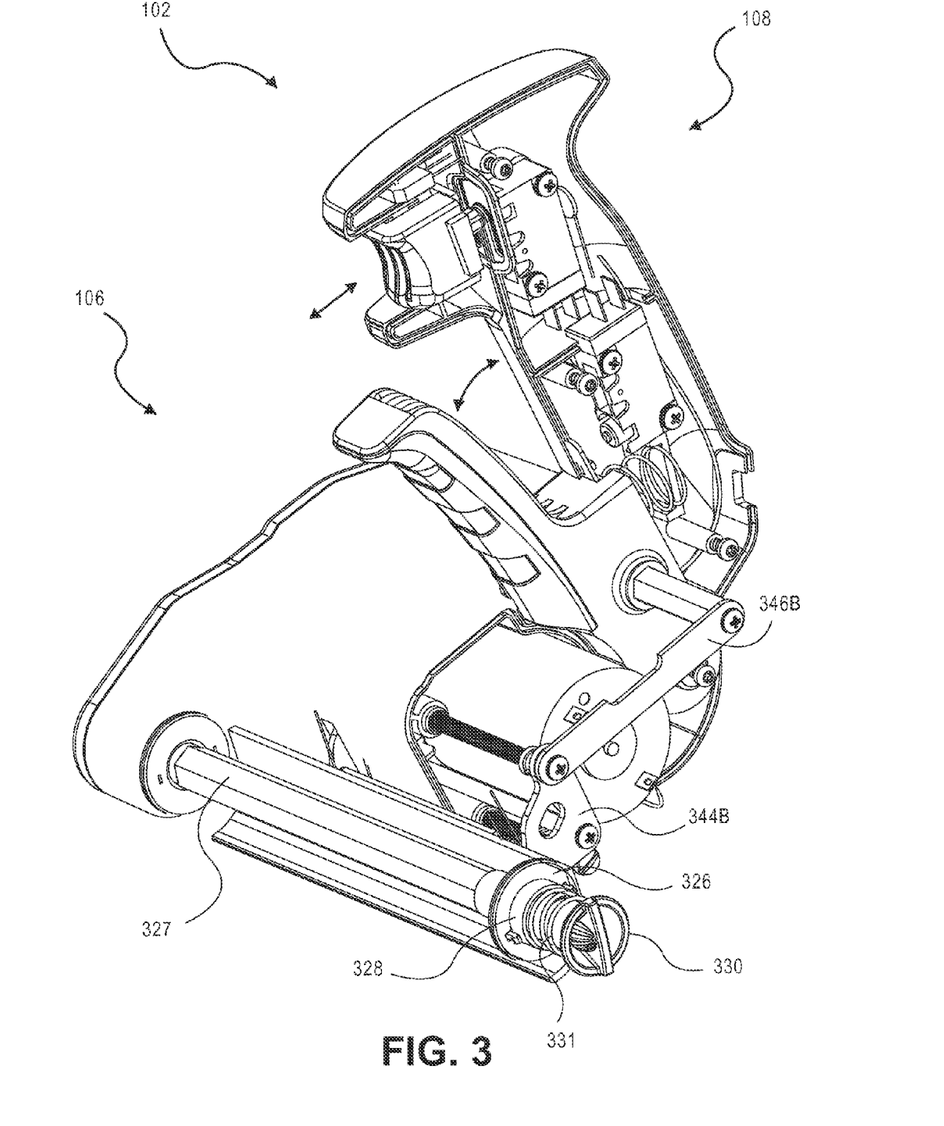
FIG. 3 is a partial cut away illustration of the fish skinning device of FIG. 1 in accordance with example implementations of the present disclosure.

Referring to FIGS. 2 and 3, the housing 102 and operative components of a fish skinning device 100 are now described in further detail. Reference will be made to both FIGS. 2 and 3, and as noted above left-most digit(s) of a reference number identifies the figure in which the reference number first appears.

As shown in FIG. 2, the roller 114 includes a first (powered) end 222 that receives motive power (torque) from a motor assembly 230 and a second (support) end 224. The ends 222, 224 can be supported (e.g., via a bearing or bearing surface) by the first and second extensions 112A, 112B of the skinning portion 106 of the housing 102 to permit the roller 114 to rotate substantially freely about the longitudinal axis 118 of the roller 114 during operation. In the embodiment illustrated, motive power is supplied to one end of the roller 114 (the first (powered) end 222) to furnish motive force (torque) to turn the roller 114. However, it is contemplated that the roller 114 can be configured with two powered ends, so that motive power (torque) is applied to both ends of the roller 114. In embodiments, the first and second ends 222, 224 of the roller 114 can be supported by a bearing assembly (not shown) attached to or otherwise included in the first and second extensions 112A, 112B of the skinning portion 106 of the housing 102.

As shown in FIG. 3, a support rod 327 may extend through a central passage formed in the roller 114 to support the roller 114 between the first and second extensions 112A, 112B and/or to transfer power to the roller 114 from the motor assembly 230. For example, the support rod 327 and walls forming the central passage can have an interlocking shape, e.g., hexagonal. In other embodiments, the first end 222 can be configured to engage a corresponding gear of the motor assembly 230 to transmit motive power (torque) to the roller 114. The first end 222 may have a hexagonal-shaped cross section that fits into an aperture or recess formed in a gear used to drive the roller 114. For example, the first end 222 can connect to a gear in the gear drive using a chuck/collet-type connector included on the first end 222. The first end 222 of the roller 114 can be furnished with a shield 326, which may be similar to a shield 326 of the second end 224 to prevent liquid or debris from entering the extension 112A.

In embodiments, each end 222, 224 of the roller 114 includes a shield 326 having a cylindrical flange 328. For example, at the second end 224 of the roller 114, a shield 326 can be positioned adjacent to the second extension 112B to seal the exposed area containing the roller 114, e.g., the part of the roller 114 that comes in contact with the fish fillet, from other components within the housing 102. As shown, each shield 326 is generally disk shaped with a flange 328 that extends away from the roller 114. Although the shield 326 is described as a separate component, it is contemplated that the shield 326 can be integral with the roller 114.

A securing mechanism 330 secures the roller 114 to the skinning portion 116 of the housing 102 while facilitating substantially free rotation of the roller 114 during operation, and/or removal of the roller 114, for example, for cleaning or replacement. In embodiments, the securing mechanism includes a twist latch 332 that engages extension 112B to prevent the roller 114 from moving axially along the axis 118. The twist latch 332 can include threading, a locking protrusion, or a similar structure to secure the twist latch 332 within the extension 112B. As illustrated, the roller 114 can be biased along the axis by a spring 331 positioned between the twist latch 332 and the shield. The spring 331 exerts a force that biases the roller 114 toward extension 112A (e.g., toward the first end 222.

The motor assembly 230 includes a gear drive 232 that engages the first end 112A of the roller 114. The gear drive 232 is configured to transfer motive power from a motor 234 of the motor assembly 230 to the first end 112A of the roller 114 to rotate the roller 114 at a constant speed. In the embodiment shown, the gear drive 232 is configured to reduce the rotational speed of the motor 234. In some embodiments, the gear drive 232 can further be configured to operate at different rotational speed settings. In some embodiments, the gear drive 232 and/or the motor 234 may be configured to reverse the direction of rotation of the roller 114, e.g., to free jammed material from between the roller 114 and blade 116, and so forth.

The motor 234 may be an electric motor, such as an alternating current (AC) motor. Further, the motor 234 can be powered from a conventional power supply (e.g. a 110V power supply, a 220V power supply, etc.) included in a building, from a 12V electrical system included in a vehicle, from a battery included in the fish skinning device 100, and so forth. In some embodiments, the fish skinning device 100 can include an electrical cord and plug configured to be connected to an 110V outlet, a 220V outlet, etc.; a cigarette lighter adapter plug configured to be connected to a cigarette lighter receptacle; and so forth. In battery powered implementations, the battery or batteries can be rechargeable batteries or disposable batteries. The batteries, whether rechargeable or not, can be configured for convenient removal.

In embodiments, the fish skinning device includes a switch configured to control operation of the motor assembly. For example, as illustrated in FIG. 2, the fish skinning device 100 employs a trigger switch 238 that is included on the handle 108 to control operation of the motor 234. In this embodiment, the trigger switch 238 may be depressed by a user to cause the motor 230 to provide a motive force (torque) to the gear drive 232 to turn the roller 114 (e.g., provided the interlock is engaged as discussed herein below).

In other embodiments, the switch may comprise a manually operated electromechanical component having electrical contacts. The switch can be operated to place the contacts in various states. For example, the contacts can be placed in an "on" position (i.e., a closed state where electrical current can flow to the motor 234), or in an "off" position (i.e., an open state where the switch is non-conducting). In implementations, the mechanism actuating the transition between the open and closed states of the switch 238 can be a toggle-type switch (flip-for continuous "on" or "off") or a momentary-type switch (push-for "on") (e.g., provided an interlock is engaged as discussed herein below).

In embodiments, the trigger switch 238 is configured with an interlock, either mechanical or electrical, to prevent unintended actuation of the motor 234 to turn the roller 114. For example, the trigger switch 238 can be configured not to function (e.g., the trigger switch 238 cannot be depressed by a user, or the trigger switch 238 output is disabled so that the switch 238 can be manipulated but the switch 238 is electrically disconnected from the motor 234) unless lever 240 is actuated so that the blade 116 is in the second (closed) position. As shown, the lever 240 is configured as a grip lever configured to position the blade 116 between a first (open) position where the blade 116 is spaced away from the roller 114 and a second (closed) position where the blade 116 is positioned closer to the roller in comparison to the open position. One or more control modules 242 can be included for controlling electrical signaling between one or more of the switch 238, the lever 240, or the motor 234. As illustrated in FIG. 2, the lever 240 is positioned in the handle portion 104 along the handle 108 so a user can manipulate the switch 238 and the lever 240 at substantially the same time.

With continued reference to FIG. 2, in embodiments, the roller 114 includes a series of radial projections 236 that extend generally parallel to the longitudinal axis 118 of the roller 114. The roller 114 is configured to grip the skin or bones during operation to move the fillet past the blade 116 in order to separate the skin and/or bones from the meat. In other embodiments, the roller 114 has an outer surface that is textured or tacky (e.g., formed of rubber or another material configured to grip) to allow the roller 114 to engage the skin/bones. In some embodiments, the roller 114 includes grooves and has a diameter of at least approximately one and one-half inches (1.5 in.). In some embodiments, the roller 114 is at least approximately five and one-half inches (5.5 in.) long. In other embodiments, the roller 114 is at least approximately seven inches (7 in.) long. However, these dimensions are provided by way of example only and are not meant to limit the present disclosure. In other embodiments, the roller 114 has a diameter greater than or less than one and one-half inches (1.5 in.). Further, in some embodiments, the roller 114 is less than five and one-half inches (5.5 in.) in length, is between five and one-half inches (5.5 in.) and seven inches (7 in.) in length, is greater than seven inches (7 in.) in length, and so forth.

As illustrated, the blade 116 defines a curved portion (e.g., a concave curve) that is oriented so the blade's curve corresponds to the outer surface of the roller, e.g., the blade's curve coincides with the outer surface of the roller. In this way, at least a portion of the blade is circumferentially spaced apart from the roller's outer surface and is spaced radially from the axis 118 to form a fillet of generally uniform thickness.

The blade 116 can be oriented so the leading edge opposes the roller's direction of rotation. In this configuration, the fillet can come into contact with the leading edge of the blade before it comes into contact with other portions of the blade, such as the main body of the blade. As a result, the leading edge can separate the meat and skin while the main body directs the skin and meat in different directions so the skin and meat can be handled separately.

In some embodiments, the blade 116 is formed from a single piece of material, such as a curved piece of stainless steel. In other embodiments, a leading portion of the blade 116, including the leading edge 120, is formed as a separate piece that can be connected to, for example, the main body of the blade. For example, the leading portion is connected to the main body by a sliding dovetail structure so the blade can be removed for sanitation, and so forth. Further, a trailing portion of the blade may be configured to cause the skin and/or the meat to go in different directions. For example, the trailing edge of the blade may flair or angle from the blade's curved cross-section so the skin and meat exit the fish skinning device in substantially different directions, e.g., out a front part of the skinning portion 106 and out the top of the skinning portion 106 when the fish skinning device is oriented as shown in FIG. 2.

With continued reference to FIGS. 2 and 3, the blade actuation assembly is illustrated and described. As shown, the fish skinning device 100 includes a blade actuation assembly supporting the blade 116. The blade actuation assembly includes first and second brackets 244A, 344B connected to the blade 116.

Figure 4A:
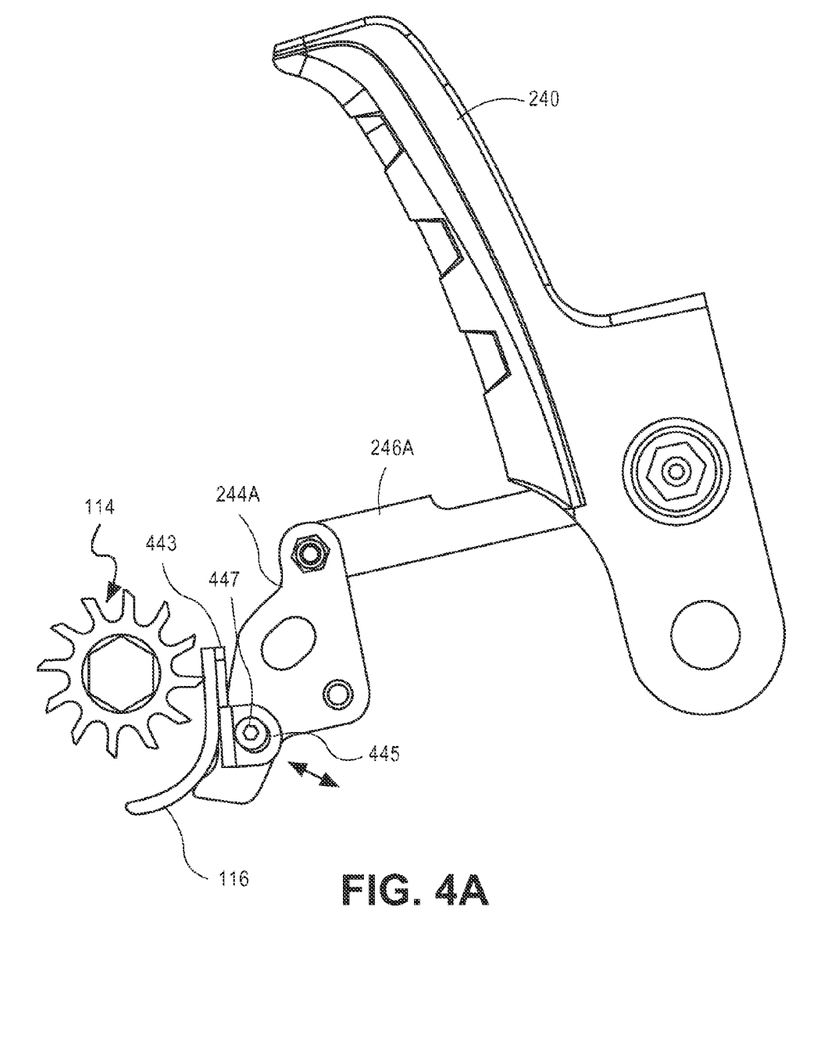
FIG. 4A is a partial cross-sectional, side elevational view illustrating the blade actuation assembly of the fish skinning device shown in FIG. 1 wherein the blade is shown in an open position.

With reference to FIG. 4A, a side elevational view of the blade actuation assembly of the fish skinning device in the open position is illustrated. In an open position, the blade 116 is positioned further away from the roller 114 in comparison to a closed position. The open position can permit a fish or a portion thereof, e.g., a fillet, to be inserted for processing. For example, the open configuration can correspond to the lever's maximum, or substantially maximum pivot position away from the handle 108. In embodiments, the blade actuation assembly is biased toward an open position with sufficient spring force so a fish can be fed into the device 100. As shown, the blade 116 is coupled to a blade support 443 included in the blade actuation assembly. The blade support 443 is coupled to the first and second brackets 244A and 344B.

The blade actuation assembly is configured to permit the blade 116 and/or blade support 443 to float with respect to the blade actuation assembly and/or a work piece (e.g., a fish fillet). For example, the blade actuation assembly includes a blade float assembly in which one or more of the blade 116, blade support 443, lever 240, or the brackets 244A and 344B includes a slot constructed to permit the blade to float, e.g., adjust its position with respect to the blade actuation assembly in operation. For example, the blade 116 and/or blade support 443 can float in the slot as generally indicated by the arrow included in FIG. 4A depending on the toughness of the meat/muscle the blade is cutting. In some embodiments, the blade 116 can tilt along its major axis 118 so the blade 116 can adjust based on characteristics of the fish/fillet, e.g., shape, toughness, thickness, and so forth. In the illustrated embodiment, tilting of the blade 116 along its length can be accomplished with one or more slots included in the brackets 244A and/or 344B and/or an end of the blade support 443 that permits the end of the blade 116 to float with respect to the blade actuation assembly.

Further, other components of the blade actuation assembly can be configured with a slot to permit blade adjustment, e.g., fine blade adjustment. For example, the blade float assembly can include a screw 447, a fastener, a boss, a pin, or the like that engages with the wall(s) that form the slot to limit movement of opposing components. In this manner, the blade 116 can adjust with respect to the brackets 244A and/or 344B by sliding along the slot. The blade 116 can adjust in one or more directions, e.g., slide toward/away from the brackets 244A and/or 344B and/or tilt along the length of the blade 116. It is to be appreciated that the blade 116 and/or blade support 443 can also be adjusted based on movement of the lever 240, e.g., from an open to a closed position (the open position is illustrated in FIG. 4A).

The blade 116, blade support 443, and/or brackets 244A and 344B can be connected in a variety of ways. In embodiments, the blade 116 is secured to the blade support 443 and/or the blade actuation assembly by a quick lock mechanism that is configured to allow for rapid removal/connection of the blade 116. For example, the blade 116 can be configured to connect/remove from a blade support 443 by sliding the blade 116 longitudinally into/out of connection with the blade actuation assembly. Other quick lock mechanisms are also contemplated. Example connections include, but are not limited to: screws, interconnecting tabs/slots, mechanical fasteners, clip systems, and so on. The blade actuation assembly can be configured so the blade 116 can be removed for cleaning, sanitizing, and the like.

Figure 4B:
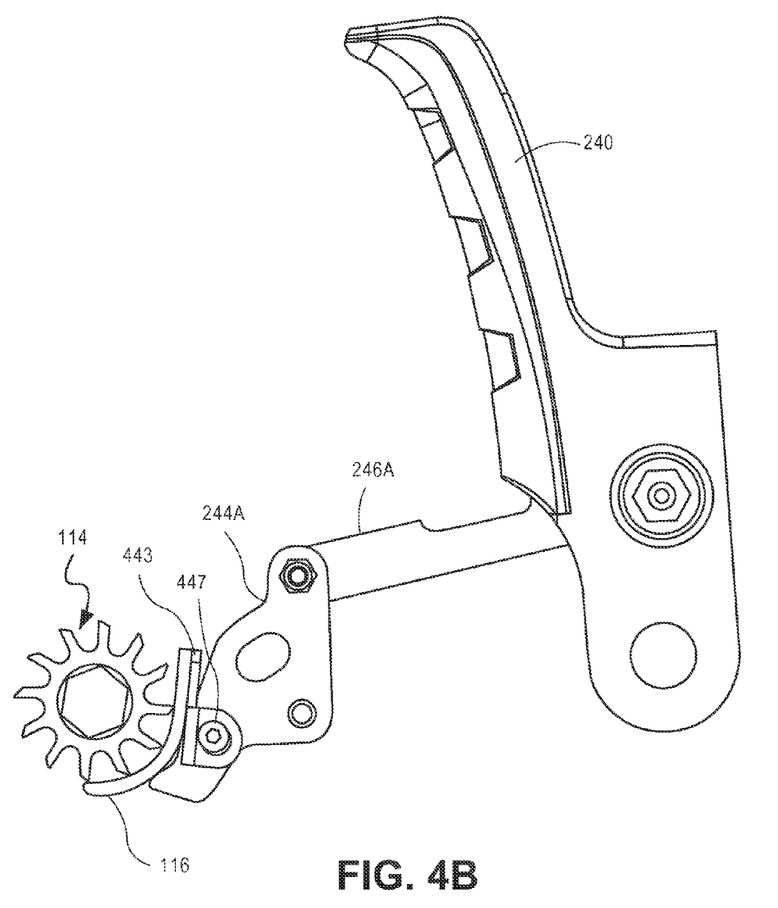
FIG. 4B is a partial cross-sectional, side elevational view illustrating the blade actuation assembly of the fish skinning device shown in FIG. 1 wherein the blade is shown in a closed position.

FIG. 4B illustrates the fish skinning device 100 in a closed orientation. In a closed position, the blade 116 may be positioned closer to the roller 114 than the open position, so the roller 114 can engage the skin/bones to draw a fillet through the fish skinning device 100 to separate the skin or the bones from the meat forming the fillet. In embodiments, the closed position corresponds generally to the minimum distance between the roller's outer surface and the blade 116. It is to be appreciated that the blade 116 and/or blade support 443 can be permitted to float when the blade actuation assembly is in a closed position. As described, the blade actuation assembly may be positioned between the open and closed position based on movement of the lever 240.

With reference to FIGS. 2 and 3, the first and second brackets 244A and 344B are pivotally mounted in the skinning portion 106 to adjust the blade's position with respect to the roller 114. For example, the blade actuation assembly can be manipulated to control the position of the blade 116 with respect to the axis 118 and/or outer surface of the roller 114. Manipulation of the lever and blade actuation assembly are illustrated generally in FIG. 3 as arrows. In this way, the skin may be initially fed between the roller and blade, and the blade can be adjusted to a filleting position where the leading edge of the blade 116 is positioned adjacent to the inner surface of the skin. It is to be apparent that the brackets 244A and 344B can be mounted directly to the skinning portion 106 or connected to a rod that in-turn is mounted to the skinning portion.

As shown, first and second linkages 246A and 346B are included in the blade actuation assembly. The linkages 246A and 346B connect the lever 240 to the first and second brackets 244A and 344B in an offset manner so the lever 240 is useable to pivot the brackets 244A and 344B to change the position of the blade 116 with respect to the roller 114. For example, the linkages 246A and 346B connect to the lever 240 and brackets 244A and 344B, respectively, at positions that are spaced away from a pivot point about which the lever or brackets rotate so the lever 240 can change the position of the blade 116. In embodiments, the blade actuation assembly and/or first and second brackets 244A and 344B are biased so the blade 116 is positioned substantially at its maximum position away from the roller 114.

Figure 5A:
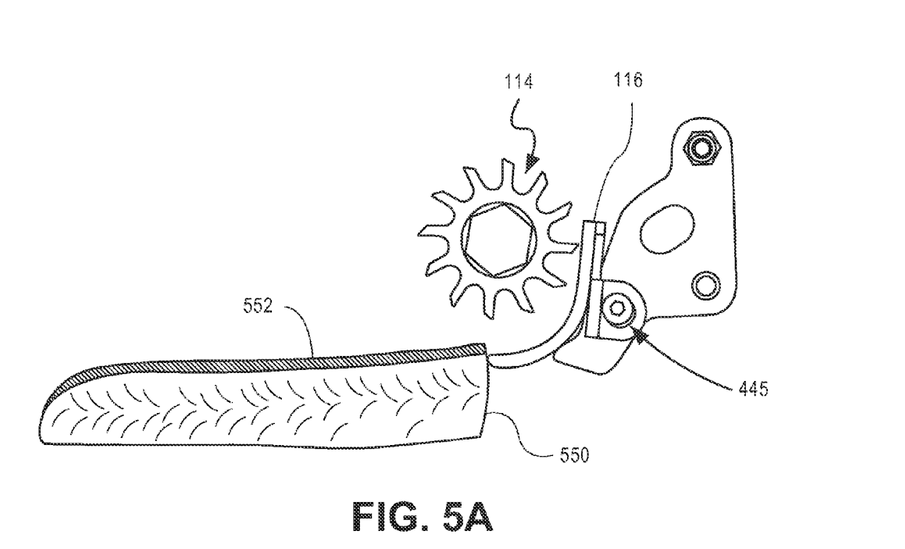
FIG. 5A is a partial cross-sectional, side elevational view illustrating the blade actuation assembly of the fish skinning device shown in FIG. 1 wherein the blade is shown in the open position, a fillet including skin is also illustrated solely for discussion purposes.
Figure 5B:
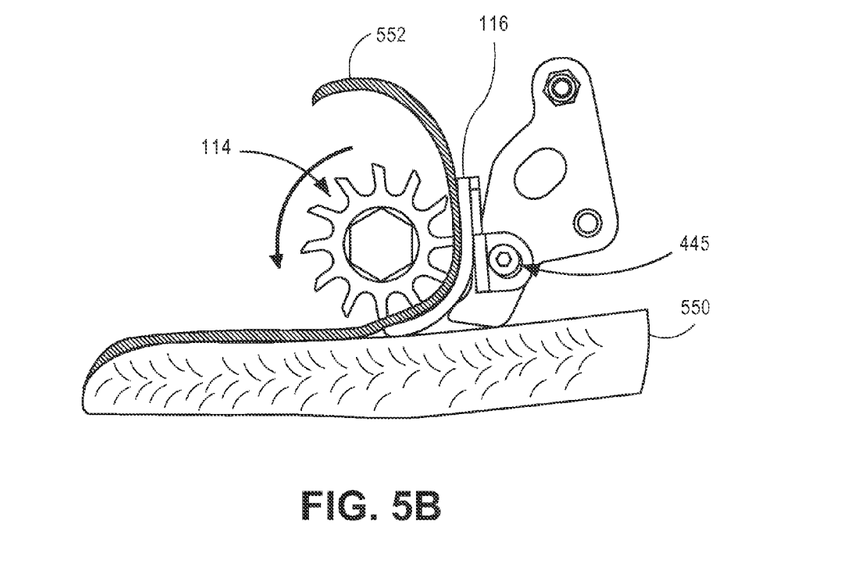
FIG. 5B is a partial cross-sectional, side elevational view illustrating the blade actuation assembly of the fish skinning device shown in FIG. 1 wherein the blade is shown in the closed position, a fillet including skin is also illustrated solely for discussion purposes.
Figure 6A:
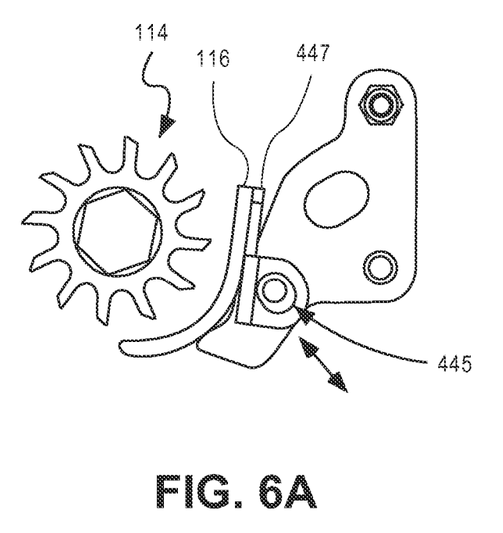
FIG. 6A is a partial cross-sectional, side elevational view illustrating the blade actuation assembly of the fish skinning device shown in FIG. 1 in the open position.
Figure 6B:
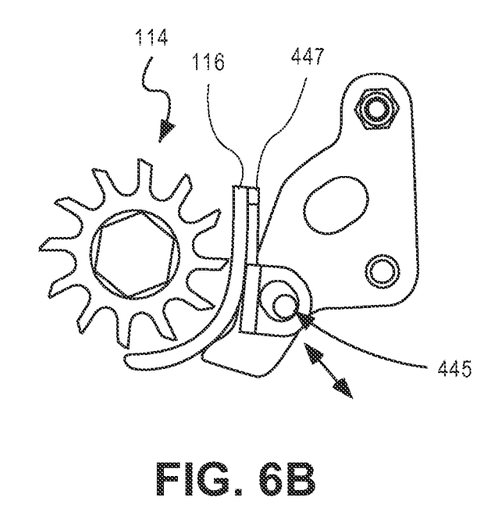
FIG. 6B is a partial cross-sectional, side elevational view illustrating the blade actuation assembly of the fish skinning device shown in FIG. 1 in the closed position.

With reference to FIGS. 5A, 5B, 6A, and 6B, the blade actuation assembly and/or lever 240 can be configured so the lever 240 is operable to provide sufficient pressure of the blade 116 towards the roller 114. In this manner the blade 116 can be positioned between the meat 550 and the inner surface of the skin 552. For example, as generally depicted in FIGS. 5A and 6A, in an open position (illustrated) a fillet including skin can be positioned so the skin 552 is between the blade 116 and the roller 114. In FIGS. 5B and 6B, the blade 116 can be adjusted to a closed position (illustrated) that permits the roller 114 to grasp the skin 552 and pull the fillet past the blade to separate the meat 550 from the skin. As can be seen in both FIGS. 5A and 5B, the blade float assembly included in the blade actuation assembly can permit the blade 116 to float with respect to the meat 550.

Further, it is to be appreciated that the lever and blade actuation assembly can be configured so the lever 240 provides tactile feedback that indicates the blade 116 is positioned adjacent to the underside of the skin 552. For example, the blade actuation assembly can be configured so a noticeable amount of additional pressure has to be applied to the lever 240 to cut through the skin. In this way, a user may notice that he/she has to apply significantly more pressure to the lever and thereby avoid inadvertently cutting into or through the skin during use. In this manner, the fish skinning device 100 can allow the blade 116 to follow the interface of the skin/meat without inadvertently cutting through the skin and/or wasting meat.

Figure 6C:
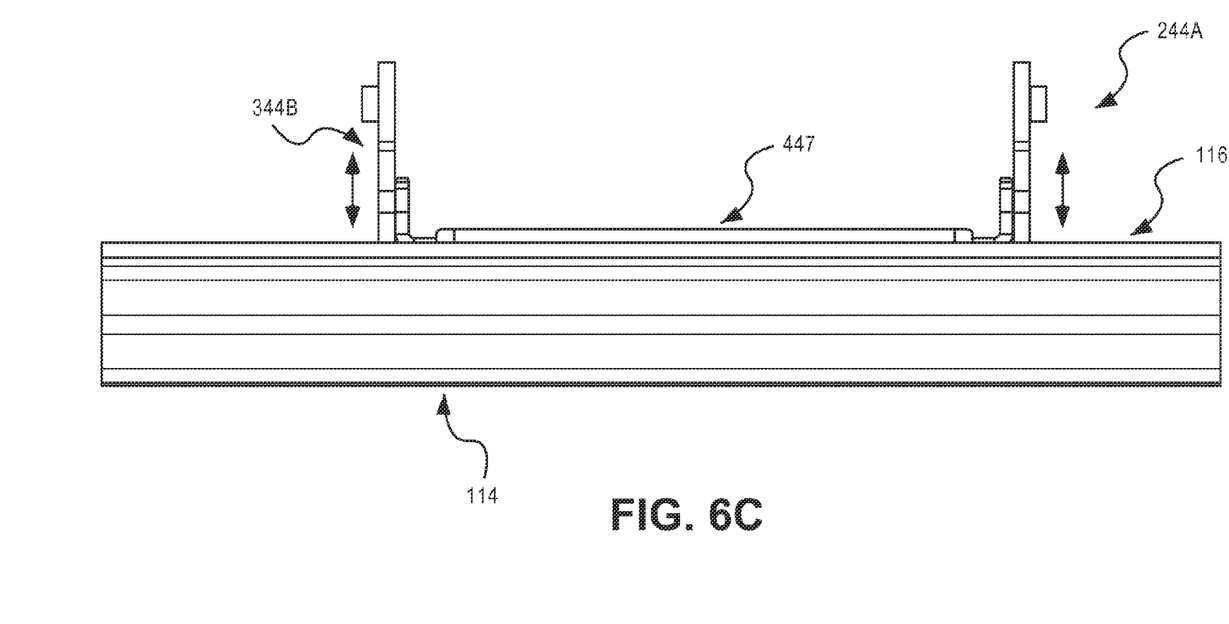
FIG. 6C is a partial bottom view illustrating the blade actuation assembly of the fish skinning device shown in FIG. 1.

Referring now to FIG. 6C, one or more of the blade 116 or blade actuation assembly is configured with end stops or tabs that can eliminate or minimize the likelihood of the fillet moving laterally along the length of the roller. For example, the brackets may prevent the fillet from coming in contact with an end of the roller, e.g., the power or second end. As can be seen in FIG. 6C, the blade 116 curves partially around the roller 114 along the bottom of the fish skinning device and is supported by the brackets 244A and 344B, and linkages 246A and 346B. In some embodiments, the trailing portion of the blade 116 can curve upwardly partially around the roller 114 so the blade can separate the meat from the skin/bones that pass between the blade and the roller. The meat can pass between the brackets 244A and 344B on a side of the blade opposite the roller 114.

Figure 7:
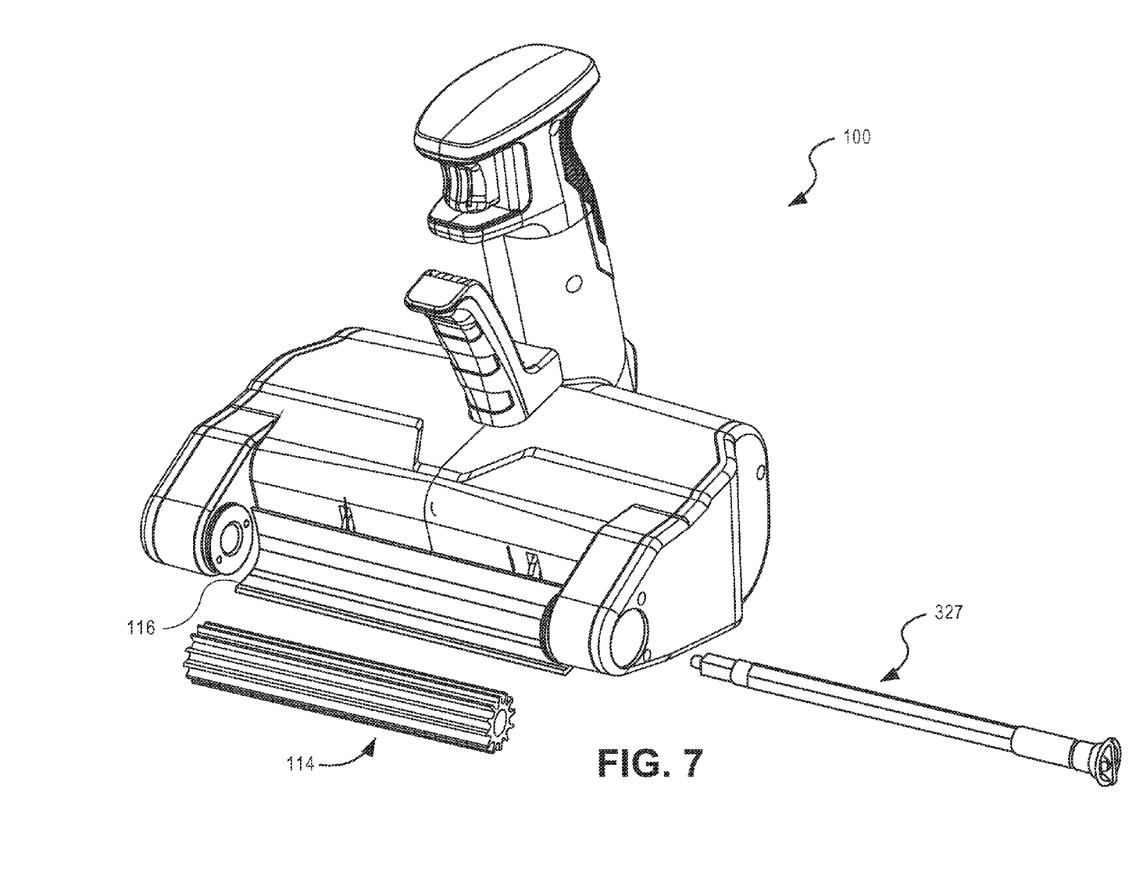
FIG. 7 is a partial exploded view of the of the fish skinning device shown in FIG. 1.

FIG. 7 illustrates the fish skinning device 100 of FIG. 1 with the roller 114 removed. As can be seen, the rod 327 can be removed from the roller 114 and first end so the roller can be cleaned and so forth. The rod 327, for example, is twisted to unsecure it from the skinning portion 106, e.g., to unlock corresponding threads or tabs included on the rod 327 and skinning portion 106. Removal of the roller 114 may permit the blade 116 to be removed for cleaning, replacement, and the like.

During operation, the outer surface of the skin 552 or bones of a fillet is contacted with the roller 114 of the fish skinning device 100. For example, the fillet can be placed in contact with the roller 114 so the outer surface of the skin 552 comes in contact with the roller 114 so it can pull the fillet into contact with a leading edge included on a blade 116. In embodiments, the roller 114 can be rotating when initial contact is made between an outer surface of the roller 114 and the skin 552 or the skin 552 can be placed in contact and the roller 114 started as part of the contacting process. In embodiments, the roller's rotation is selected so the fillet engages the leading edge substantially prior to contacting the other portion of the blade 116.

The fillet may be positioned and/or the roller 114 may automatically position the skin 552 so it passes between the roller 114 and the blade 116. By configuring the skin 552 to pass between the roller 114 and the blade 116, the skin 552 is used to pull the meat 550 past the leading edge of the blade 116 and the skin's relative toughness in comparison to the meat 550 can reduce the likelihood of the fillet becoming jammed and/or the skin 552 tearing during the separation process. Also, positioning the skin 552 between the roller 114 and blade 116 can prevent damage to the meat 550 (e.g., due to operation of the roller 114).

The skin 552 and meat 550 that forms the fillet are separated. For example, the roller's outer surface can engage the skin 552 to pull it in order to cause the fillet to pass by the blade 116 that separates the meat 550 and skin 552 from one another. In embodiments, separation includes permitting the blade 116 to float so it can automatically adjust based on the toughness of the meat 550 the blade is cutting. For example, the blade 116 and blade support 443 can be coupled by a blade float assembly including a slot that permits the blade 116 to make fine adjustments based on the toughness of the meat 550 that is being separated from skin 552 and/or bones.

Optionally, the blade 116 is positioned by pivoting the blade adjacent an interface between the skin 552 and meat 550. For example, the blade's position with respect to the roller 114, e.g., an outer surface of the roller 114, can be adjusted by pivoting a blade actuation assembly to force the blade 116 closer to the roller 114 and/or skin that is positioned between the roller 114 and blade 116.

A substantially proper position of the blade 116, e.g., a position that maximizes edible meat recovery, yields a visually pleasing fillet, and so forth, can be identified based on the skin's toughness or resistance to cutting in comparison to that of the meat 550. The interface between the skin 552 and meat 550 can be tactilely identified because a noticeable amount of additional force may be needed to direct the blade 116 closer to the roller 114 and the skin 552, in comparison to the interface where the skin 552 and meat 550 can separate with less force applied to the blade actuation assembly.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a blade having an edge configured to separate at least one of skin or rib bones from meat included in a fish fillet;
   a roller having a generally cylindrical shape and an axis that extends parallel to the edge of the blade, the roller configured to draw at least a portion of the skin or rib bones between the roller and the blade to separate the skin or rib bones from the meat of the fish fillet; and
   a blade float assembly configured to allow the blade to float with respect to the roller.

2. The device as recited in claim 1, further comprising a blade actuation assembly configured to support the blade and to facilitate movement of the blade from a first position adjacent to an outer surface of the roller and a second position wherein the blade is spaced away from the roller, the blade actuation assembly configured to bias the blade to the second position.

3. The device as recited in claim 2, wherein the blade float assembly comprises a blade support bracket coupled to the blade and a support linkage coupled to the blade actuation assembly, the support linkage coupled to the blade support bracket via a slot and pin assembly to facilitate movement between the blade support bracket and the support linkage to allow the blade to float with respect to the roller.

4. The device as recited in claim 2, wherein the blade actuation assembly comprises a lever assembly including a lever configured to be depressed to cause the blade actuation assembly to move the blade toward the roller to reduce the distance between the outer surface of the roller and the blade so that the edge of the blade is positioned adjacent the skin or rib bones.

5. The device as recited in claim 4, further comprising a housing comprising:
   a handle portion including a grip configured to be grasped by a user, the lever disposed in the handle so that the user grasping the grip can depress the lever; and
   a skinning portion coupled to the to the handle portion, the skinning portion configured to support the blade and roller therein.

6. The device as recited in claim 5, further comprising a motor assembly configured to rotate the roller about the axis in a direction toward the edge of the blade.

7. The device as recited in claim 6, wherein the motor assembly comprises a motor and a gear drive configured to cause the roller to rotate about the axis.

8. The device as recited in claim 7, wherein the roller comprises a disconnection assembly configured to facilitate disconnection of the roller from the gear drive to permit removal of the roller from the housing.

9. The device as recited in claim 8, wherein the handle portion comprises a trigger switch configured to cause the motor assembly to rotate the roller, the trigger switch interlocked with the blade actuation assembly to prevent operation of the motor assembly when the blade is not in the first position.

10. A fish skinning device comprising:
- a blade having an edge configured to separate at least one of skin or rib bones from meat included in a fish fillet;
- a roller having a cylindrical shape and an axis that extends parallel to the edge of the blade, the roller being configured to draw at least a portion of the skin or rib bones between the roller and the blade to separate the skin or rib bones from the meat of the fish fillet;
- a motor assembly configured to rotate the roller about the axis in a direction toward the edge of the blade;
- a blade actuation assembly configured to support the blade and to facilitate movement of the blade between a first position wherein the blade is spaced away from the roller and a second position wherein the blade is adjacent to an outer surface of the roller; and
- a blade float assembly configured to allow the blade to float with respect to the roller to receive the skin or rib bones of the fish fillet between the roller and the blade.

11. The fish skinning device as recited in claim 10, wherein the blade float assembly comprises spaced apart blade support brackets coupled to the blade and spaced apart support linkages coupled to the blade actuation assembly, each of the support linkages coupled to a respective one of the spaced apart blade support brackets via a slot and pin assembly to facilitate movement between the blade support bracket and the support linkage.

12. The fish skinning device as recited in claim 10, wherein the blade actuation assembly comprises a lever assembly including a lever configured to be depressed to cause the blade actuation assembly to move the blade toward the roller to reduce the distance between the outer surface of the roller and the blade so that the edge of the blade is positioned adjacent the skin or rib bones.

13. The fish skinning device as recited in claim 10, further comprising a housing including:
- a handle portion including a grip configured to be grasped by a user, the lever disposed in the handle so that the user grasping the grip can depress the lever; and
- a skinning portion coupled to the to the handle portion, the skinning portion configured to support the blade and roller therein.

14. The fish skinning device as recited in claim 10, wherein the motor assembly comprises a motor and a gear drive configured to cause the roller to rotate about the axis.

15. The fish skinning device as recited in claim 10, wherein the roller comprises a disconnection assembly configured to facilitate disconnection of the roller from the gear drive to permit removal of the roller from the housing.

16. The fish skinning device as recited in claim 10, further comprising a trigger switch configured to cause the motor assembly to rotate the roller, the trigger switch interlocked with the blade actuation assembly to prevent rotation of the roller by the motor assembly when the blade is not in the first position.

17. A fish skinning device comprising:
- a housing;
- a blade having an edge configured to separate at least one of skin or rib bones from meat included in a fish fillet;
- a roller having a cylindrical shape and an axis that extends parallel to the edge of the blade, the roller being configured to draw at least a portion of the skin or rib bones between the roller and the blade to separate the skin or rib bones from the meat of the fish fillet;
- a motor assembly disposed in the housing, the motor assembly configured to rotate the roller about the axis in a direction toward the edge of the blade;
- a blade actuation assembly configured to support the blade and to facilitate movement of the blade from a first position adjacent to an outer surface of the roller and a second position wherein the blade is spaced away from the roller;
- a trigger switch configured to cause the motor assembly to rotate the roller, the trigger switch interlocked with the blade actuation assembly to prevent rotation of the roller by the motor assembly when the blade is not in the first position; and
- a blade float assembly configured to allow the blade to float with respect to the roller to receive the skin or rib bones of the fish fillet between the roller and the blade.

18. The fish skinning device as recited in claim 17, wherein the blade float assembly comprises spaced apart blade support brackets coupled to the blade and spaced apart support linkages coupled to the blade actuation assembly, each of the support linkages coupled to a respective one of the spaced apart blade support brackets via a slot and pin assembly to facilitate movement between the blade support bracket and the support linkage.

19. The fish skinning device as recited in claim 17, wherein the blade actuation assembly comprises a lever assembly including a lever configured to be depressed to cause the blade actuation assembly to move the blade toward the roller to reduce the distance between the outer surface of the roller and the blade so that the edge of the blade is positioned adjacent the skin or rib bones.

20. The fish skinning device as recited in claim 17, wherein the roller comprises a disconnection assembly configured to facilitate disconnection of the roller from the gear drive to permit removal of the roller from the housing.

* * * * *